Nov. 7, 1939.  O. V. PAYNE  2,179,347
PICKING MOTION FOR LOOMS
Filed Jan. 17, 1938  2 Sheets-Sheet 1

Inventor
Oscar V. Payne
Chas. T. Hawley
Attorney

Nov. 7, 1939.   O. V. PAYNE   2,179,347
PICKING MOTION FOR LOOMS
Filed Jan. 17, 1938   2 Sheets-Sheet 2
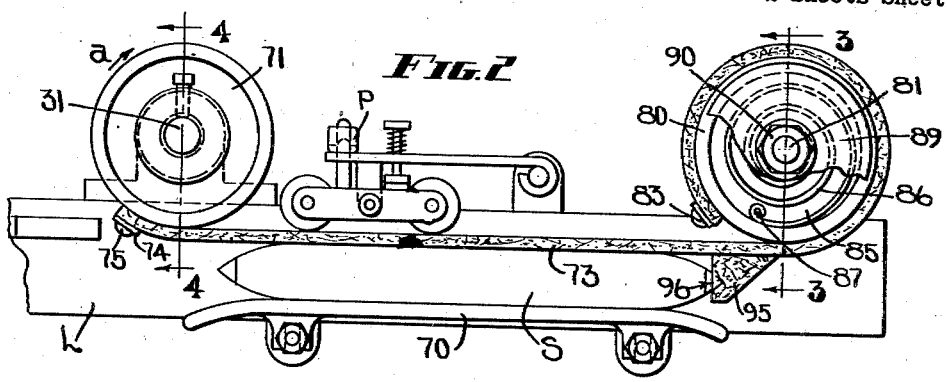
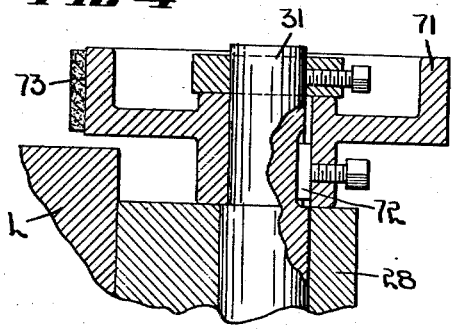
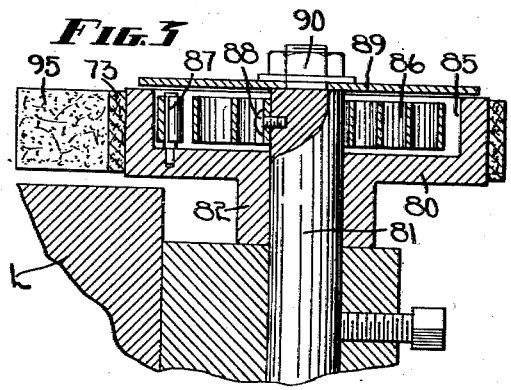
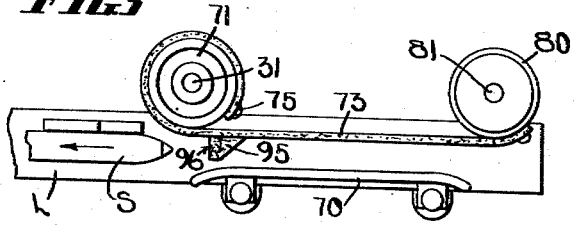
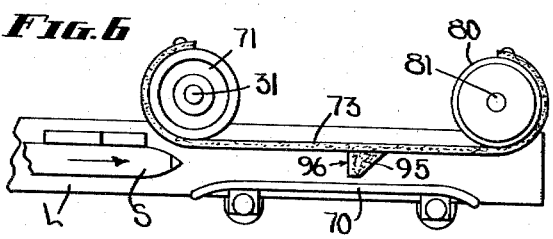
Inventor
Oscar V. Payne
Chas. P. Hawley
Attorney Patented Nov. 7, 1939

2,179,347

UNITED STATES PATENT OFFICE 2,179,347

PICKING MOTION FOR LOOMS

Oscar V. Payne, Leicester, Mass., assignor to Crompton & Knowles Loom Works, Worcester, Mass., a corporation of Massachusetts Application January 17, 1938, Serial No. 185,320

10 Claims. (Cl. 139—142)

This invention relates to improvements in picking motions for looms and it is the general object of the invention to provide a simplified form of belt picking motion which will give positive as well as frictional forces to the shuttle.

Heretofore I have proposed a form of belt picking in which an endless belt guided by two sheaves on the lay has frictional contact with a side of the shuttle. The belt was driven by a sheave connected to driving mechanism operated either electrically, or by a spring, or by a cam motion. It is an important object of my present invention to attach the belt to the sheaves and provide it with a picking lug which will positively engage the end of a shuttle. In this way the picking lug moves along the same path for all picking motions of the belt.

It is a further object of the invention to utilize the positive drive for the picking sheave to limit angular motion of the latter and thereby serve to hold the picking lug in position to stop the shuttle in correctly boxed position.

It is a further object of my invention to provide a return sheave also attached to the belt and provide it with some means, such as a spring, which can be placed under strain during the picking motion and thereafter operate to return a belt and picking lug to shuttle receiving position. The spring will exert a constant force tending to return the belt but this force acts only as it is permitted to do so by the actuator for the driving sheave.

It is a further object of my present invention to provide yielding resistance to the outer end of the belt as the latter has a picking motion for the purpose of holding the belt constantly in frictional engagement with the shuttle throughout the picking motion. This yielding resistance is preferably caused by the same means which returns the belt to normal position after picking.

It is a further object of my invention to control the return motion of the picking lug so that it is moving outwardly when the shuttle is boxed. The tendency for the shuttle to rebound is greatly reduced due to the fact that picker and shuttle are moving in the same direction at the time of engagement.

With these and other objects in view which will appear as the description proceeds, my invention resides in the combination and arrangement of parts hereinafter described and set forth.

In the accompanying drawings, wherein a convenient embodiment of my invention is set forth:

Fig. 2 is an enlarged plan view taken in the direction of arrow 2, Fig. 1,

Figure 1:
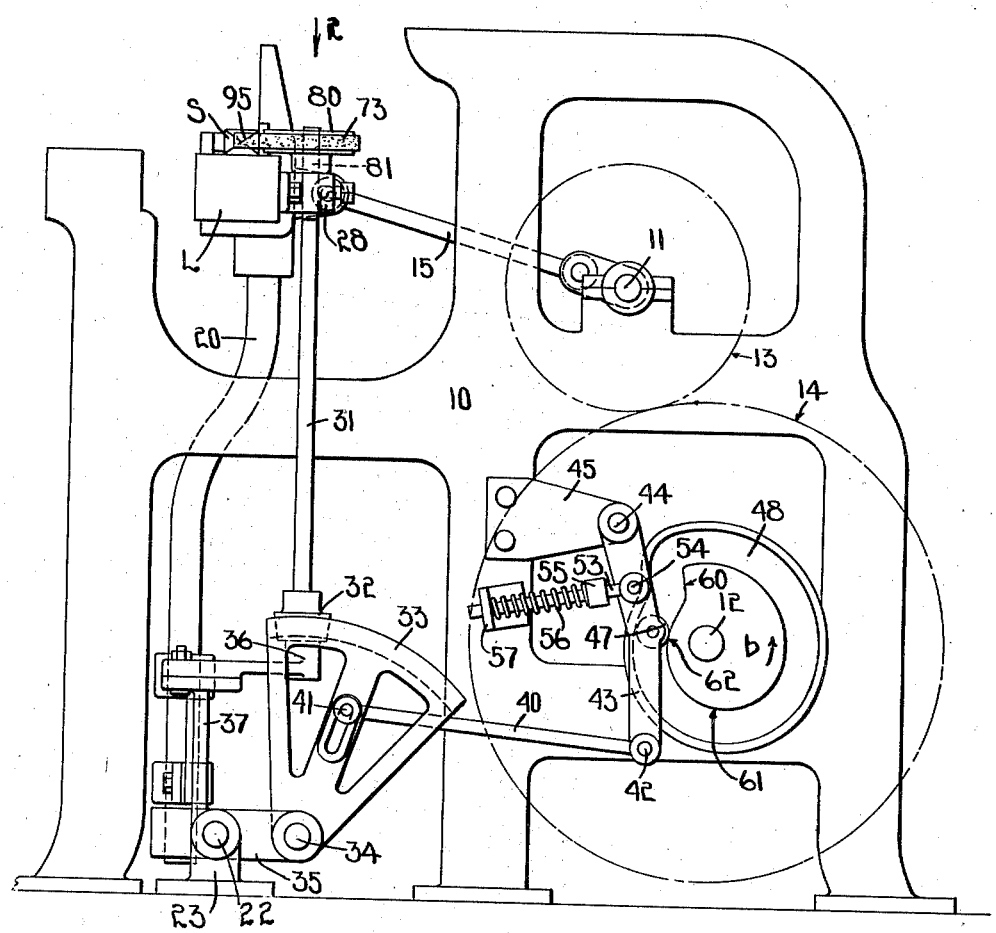
Fig. 1 is an end elevation of a loom having my invention applied thereto.

Figs. 3 and 4 are vertical transverse sections on lines 3—3 and 4—4, respectively, of Fig. 2, and Figs. 5 and 6 are diagrammatic views showing the belt at the instant of completing the pick and preparatory to receiving a shuttle, respectively.

Referring particularly to Fig. 1, I have shown a loom frame 10 having top and bottom shafts 11 and 12, respectively, which may be connected by gears 13 and 14 which require the bottom shaft to move at half the speed of the top or crank shaft. A connector 15 on the crank shaft is attached to the lay L to reciprocate the latter in the usual manner. The lay is mounted on swords one of which is shown at 20 movable about the fixed axis 22 carried by a bracket 23 fixed with respect to the loom frame.

The rear part of the lay carries a bearing 28 for the upper end of a vertical shaft 31. Secured to the lower end of the shaft is a beveled pinion 32 meshing with a segment rack 33 movable about a stud 34. The latter is supported on a casting 35 secured to the lay sword. A bearing 36 for the lower end of shaft 31 is mounted on a stand 37 bolted or otherwise secured to the lay sword.

The segment 33 is driven by a connector rod 40 connected to the segment as at 41 and extending rearwardly to be connected as at 42 to the lower end of a cam lever 43. The latter is pivoted as at 44 to a stand 45 bolted to the loom frame and has a roll 47 moving in a track cam 48 secured to the bottom shaft 12.

A rod 53 pivoted to the lever 43 as at 54 extends forwardly through a guide 57 and is surrounded by a spring 56 held by a collar 55. The spring absorbs vibration of the lever 43 and serves to keep the roll 47 against the inner wall of the cam groove.

The matter thus far described may be similar to that set forth in my co-pending application Serial No. 130,129 and is illustrated as a convenient means for rotating the vertical shaft 31. The cam has been modified to accomplish one of the purposes of my present invention and has an incline 60 effective to give a sharp forward motion to lever 43 for the purpose of rocking the segment 33 to the left as viewed in Fig. 1, thereby causing rotation of pin 32. After the forward motion of the segment has been completed the roll 47 starts to move down a cam decline 61 and continues to do so during the following forward motion of the lay and until the shuttle arriving from the opposite side is completely boxed. The roll 47 then engages a cam dwell 62 preparatory to another picking operation. The incline 60 will ordinarily complete its work when the lay is at top center and the shuttle is picked as will be described hereinafter to the opposite side of the loom by a force transmitted through shaft 31. At the following top center corresponding to a space of 180° of the cam 48 the shuttle will again be picked, this time from the opposite end of the loom, and will arrive when the lay is approximately on bottom center. During this time the roll 47 is on the decline 61 and remains thereon a short time subsequent to arrival of the shuttle for the purpose of moving the picking instrumentalities in the same direction as that in which the shuttle is travelling and for the purpose of boxing the shuttle, as will be described hereinafter. This modification of the cam and the effect which it has on shuttle boxing is part of my present invention.

My invention relates also to the belt which contacts with the shuttle and the sheaves to which it is attached. Referring to Fig. 2, the lay L has a box front 70 against which lies the forward wall of the shuttle S. The upper end of the shaft 31 has secured thereto a driving sheave or pulley 71 held to the shaft as by a key 72 shown in Fig. 4. A belt 73 has the left or inner end thereof secured directly to the periphery of the pulley 71 by means of a plate 74 and screw 75, the latter passing through the plate and being threaded into the pulley so that the plate presents a relatively large area to force the end of the belt against the pulley.

At the outer end of the lay a second sheave 80 is rotatively mounted on a stud 81 extending upwardly from the lay and passing through the hub 82 of sheave or pulley 80. The right or outer end of the belt as viewed in Fig. 2 is secured to pulley 80 by a connection 83 similar to that for the inner end. The upper surface of the pulley 80 may be recessed as at 85 to receive a torsion clock spring 86 one end of which is attached to the pulley 80 as at 87 while the other end is attached as at 88 to the fixed stud 81. A protecting plate 89 lies over the spring and recess and is held in position by a nut 90.

At a point intermediate its ends the belt 73 has secured thereto a picking lug 95 which may be substantially of the form shown in Fig. 2 and having a picking surface 96 designed for direct engagement with the end of the shuttle. This lug may be secured in any manner, as by cementing or vulcanizing, to the front face of the belt and the latter is flat as suggested in Figs. 3 and 4 to present a relatively broad surface defining the rear of the shuttle box.

The protector mechanism P may be the same as that shown in my aforesaid application and set forth and claimed in more detail in my prior Patent No. 2,012,052. The protector mechanism forms no part of my present invention but it serves to push the belt against the shuttle to insure frictional contact with the latter.

In operation, rotation of the bottom shaft 12 and cam 48 in a counter-clockwise direction shown at arrow $b$ in Fig. 1 is timed to push the lever 43 forwardly when the lay is at its so-called top center position. At this time the shaft 31 is given a quick angular motion to turn the top sheave 71 in the direction of arrow $a$, Fig. 2. The effect of this is to move the shuttle to the left by two separate forces one of which is exerted positively by the picking lug 96 and the other of which is the frictional engagement of the belt 73 and the rear wall of the shuttle. As the pulley 71 completes its rotary motion the shuttle will start across the loom, as suggested in Fig. 5.

During the picking stroke the sheave 80 is required to rotate by the pull of the belt and in doing so stores up energy in the spring 86. Continued running of the loom requires the roll 47 to move down the decline 61 and at the next picking of the shuttle from the opposite end of the loom the roll will still be on the decline. As the shuttle enters the box defined in part by the belt 73 the picker 96 will still be moving outwardly or to the right as viewed in Fig. 6. The moving shuttle therefore strikes the lug while the latter is also moving and there is very little if any tendency for the shuttle to rebound. Subsequent to engagement of the shuttle and lug 95 the latter completes its motion back to the normal starting position shown in Fig. 2, the roll 47 continuing to move down decline 61 to accomplish this result and the dwell 62 of the cam not being reached by the roll until the shuttle is completely boxed.

In order to prevent the belt from being deformed by wrapping on itself and thereby reduce the width of the shuttle box I so proportion the sheaves or pulleys that the part of their periphery around which the belt wraps shall be at least equal to the longitudinal motion of the belt along the shuttle box. This condition is shown in Fig. 5 where the end of the belt on pulley 71, in travelling around the shaft 31, stops before it can reach the rear wall of the belt. If this were not so the belt would wrap on itself and be deformed with a resultant forward displacement of the picker lug 95 and consequent improper picking of the shuttle. A similar relation exists with the return pulley 80 as shown in Fig. 2, where the connection 83 lies behind that part of the belt which extends along the rear of the shuttle box when the belt is fully retracted and in normal position for picking. As a result of the proportions described the picking lug 95 moves in a straight line parallel to the flight of the shuttle throughout both its working and return strokes.

From the foregoing it will be seen that I have provided a simple means for imparting both frictional and picking force to a shuttle by means of a belt. The location of the picking lug 95 when ready for picking is determined by the belt 73 and its attachment to the pulley 71, and the location of the latter in turn depends upon the pinion 32, rack 33, cam lever 43 and cam 48. It will further be seen that the sheaves are of such proportion that their periphery along which the belt is wrapped is equal to or greater than the total motion of the belt, the circumference of the pulleys being preferably in excess of the travel of the lug 95 sufficiently to afford sufficient clearances between the straight part of the belt and the ends attached to the pulleys. The driving connections for the pulley 71 give the latter an angular motion somewhat less than 360°. It will also be seen that the spring connected to the outer return sheave serves not only to draw the picking lug 95 back to normal position, but by offering resistance to a picking motion of the belt, holds the latter straight and in constant frictional engagement with the rear wall of the shuttle throughout the picking operation. Furthermore, it will be seen that I have provided a control for the lug 95 which requires the same to move in an outward direction when it is engaged by the oncoming shuttle, the simultaneous movement of these two parts in the same direction greatly reducing the tendency of the shuttle to rebound. The actual arrival of the lug 95 to its normal outermost position may if desired be delayed until just before the next pick, but the shuttle should be sufficiently boxed at an earlier period in the loom cycle to operate the protector mechanism.

Having thus described my invention it will be seen that changes and modifications may be made therein by those skilled in the art without departing from the spirit and scope of the invention and I do not wish to be limited to the details herein disclosed, but what I claim is:

1. In a picking motion for a loom having a lay, a shuttle box on the lay, a flexible belt extending along and forming one side of the shuttle box and positioned for frictional contact with the shuttle, a rotary driving element adjacent the inner end of the shuttle box and having one end of the belt secured thereto, means to give said rotary element a shuttle driving angular motion of given degree, a second rotary element adjacent the outer end of the shuttle box to which the other end of the belt is fastened, a picking lug on the belt for engagement with the end of the shuttle, and means to give the second rotary element a return motion in a non-picking direction of said angular degree to return the picking lug to the same normal position after each picking operation, the flexible belt and lug both imparting picking forces to the shuttle.

2. In a picking motion for a loom having a lay, a shuttle box on the lay, a flexible belt extending along and forming one side of the shuttle box and having frictional contact with the shuttle, means to move the belt along the shuttle box in a direction to pick the shuttle, and a picking lug on the belt to engage the end of the shuttle and impart a picking force thereto, the flexible belt and lug both imparting picking forces to the shuttle.

3. In a picking motion for a loom having a lay, a shuttle box on the lay, a flexible belt extending along and on one side of the shuttle box and positioned for frictional engagement with a shuttle in the box, means to move the belt along the shuttle box in a direction to pick a shuttle in contact therewith, and a picking lug secured to and moving with the belt and engaging the end of the shuttle and movable with the belt along the shuttle box at the time of picking to impart a picking force to the shuttle, the flexible belt and lug both imparting picking forces to the shuttle.

4. In a picking motion for a loom having a lay, a shuttle box on the lay, a rotary driving element adjacent the inner end of the shuttle box, means to turn said rotary element in a direction to pick the shuttle, a second rotary element adjacent the outer end of the shuttle box, means to give said second rotary element a rotation in a non-picking direction, a flexible picking belt extending along and forming one side of the shuttle box and having frictional contact with the shuttle, said belt having one end secured to the first rotary element and having the other end secured to the second rotary element, and a picking lug on the belt to engage the end of the shuttle, said picking belt movable along the shuttle box while in contact with the shuttle to pick the latter by a force derived from the first rotary element, the circumferences of said rotary elements being greater than the longitudinal motion of the belt along the shuttle box, the flexible belt and lug both imparting picking forces to the shuttle.

5. In a picking motion for a loom having a lay, a shuttle box on the lay, a rotatable sheave adjacent the inner end of the shuttle box, a positive actuator for the sheave movable from one extreme position to another extreme position during picking and returning to the first extreme position subsequent to picking, a belt extending along and forming one side of the shuttle box and connected directly to the sheave, and a pick lug on the belt and positively engaging the end of the shuttle, said actuator when moving in a picking direction turning the sheave to move the belt along the shuttle box in a direction to pick the shuttle, said actuator when returning to the extreme position from which a picking motion starts effective to limit outward motion of the picking lug in the direction of travel of the shuttle as the latter enters the shuttle box.

6. In a picking motion for a loom having a lay, a shuttle box on the lay, a flexible belt extending along and forming one side of the shuttle box, a rotatable sheave adjacent the inner end of the shuttle box to which one end of the belt is secured, means to turn the sheave in a direction to move the belt along the shuttle box in a direction to pick the shuttle, a return sheave adjacent the outer end of the shuttle box to which the other end of the belt is fastened, a picking lug on the belt to engage the end of the shuttle, and means acting constantly throughout the picking motion of the belt to resist motion of the second sheave as the belt is unwrapped from said second sheave during picking for the purpose of holding the belt firmly against the shuttle during picking, the flexible belt and lug both imparting picking forces to the shuttle.

7. In a picking motion for a loom having a lay, a shuttle box on the lay, a rotatable sheave adjacent the inner end of the shuttle box, means to drive said sheave in a picking direction, a second sheave adjacent the outer end of the shuttle box, a belt extending along and forming one side of the shuttle box and having one end attached to the first sheave and having the other end normally wrapped around and attached to the second sheave, and means acting throughout a picking motion of the belt to resist rotation of the second sheave in a picking direction and thereby maintain the belt in frictional engagement with the shuttle during picking.

8. In a picking motion for a loom having a lay, a shuttle box on the lay, a rotatable sheave mounted on the lay adjacent the inner end of the shuttle box, a picking belt forming one side of the shuttle box and attached at the inner end thereof to the sheave, means to turn the sheave in a direction to cause a picking motion of the belt, and yielding means acting on the outer end of the belt throughout motion of the sheave to hold the belt taut and against the shuttle.

9. In a picking motion for a loom having a lay, a shuttle box on the lay, a rotatable sheave mounted on the lay adjacent the inner end of the shuttle box, a flexible picking belt forming one side of the shuttle box and having the inner end thereof attached to the sheave and having frictional driving contact with the shuttle, means on the belt to engage the end of the shuttle to impart a positive picking force thereto, and means to turn the sheave through an angular distance less than a complete rotation, to prevent the end of the belt attached to the sheave from engaging the part of said belt forming part of the shuttle box, both the flexible belt and the first named means imparting picking forces to the shuttle.

10. In a picking motion for a loom having a lay, a shuttle box on the lay, a flexible member extending along and forming one side of the shuttle box and having frictional driving contact with the shuttle, a picking lug on the flexible member, means to move the latter and the lug in the direction to pick the shuttle out of the box, and means to give the flexible member and lug a return motion during a subsequent boxing of the shuttle when the latter arrives from the opposite end of the loom to arrest shuttle motion relatively to the member while the lug is still moving in the same direction as that in which the shuttle moves, the flexible belt and lug both imparting picking forces to the shuttle.

OSCAR V. PAYNE.